US009041236B2

(12) United States Patent
Larsen et al.

(10) Patent No.: US 9,041,236 B2
(45) Date of Patent: May 26, 2015

(54) WIND TURBINE HAVING POWER ELECTRONICS IN THE NACELLE

(75) Inventors: Gerner Larsen, Hinnerup (DK); Thomas Hjort, Vejle Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 753 days.

(21) Appl. No.: 13/146,777

(22) PCT Filed: Dec. 22, 2009

(86) PCT No.: PCT/EP2009/067759
§ 371 (c)(1),
(2), (4) Date: Aug. 25, 2011

(87) PCT Pub. No.: WO2010/089006
PCT Pub. Date: Aug. 12, 2010

(65) Prior Publication Data
US 2011/0309629 A1 Dec. 22, 2011

Related U.S. Application Data

(60) Provisional application No. 61/150,174, filed on Feb. 5, 2009.

(30) Foreign Application Priority Data

Feb. 5, 2009 (DK) .................. 2009 00172

(51) Int. Cl.
*F03D 11/00* (2006.01)

(52) U.S. Cl.
CPC ......... *F03D 11/0058* (2013.01); *F05B 2240/14* (2013.01); *F05B 2250/30* (2013.01); *Y02E 10/722* (2013.01); *Y02E 10/726* (2013.01)

(58) Field of Classification Search
USPC ........................................... 290/55
See application file for complete search history.

(56) References Cited

U.S. PATENT DOCUMENTS

| 6,734,581 | B1 * | 5/2004 | Griffis ..................... 307/125 |
| 6,750,559 | B2 * | 6/2004 | Becker ..................... 290/55 |
| 2003/0071469 | A1 | 4/2003 | Becker |
| 2007/0222227 | A1 * | 9/2007 | Casazza et al. ............. 290/55 |
| 2007/0296220 | A1 * | 12/2007 | Kristensen ................ 290/55 |
| 2011/0278852 | A1 * | 11/2011 | Hjort ....................... 290/55 |

FOREIGN PATENT DOCUMENTS

| DE | 10 2007 062 622 | 6/2009 | |
| EP | 1 617 075 | 1/2006 | |
| EP | 1777348 A1 * | 4/2007 | ............. E02B 17/02 |

OTHER PUBLICATIONS

Author unknown; The 3.6s Offshore Wind Turbine—combining proven technology with valuable offshore expertise; date unknown; 8 pages.
Sanne H. Skovborg; 1st Technical Examination and Search Report issued in priority Denmark Application No. PA 2009 00172; Sep. 8, 2009; 6 pages; Denmark Patent and Trademark Office.
Laurent Libeaut; International Search Report and Written Opinion issued in priority International Application No. PCT/EP2009/067759; Mar. 22, 2011; 12 pages; European Patent Office.

* cited by examiner

*Primary Examiner* — Tho D Ta
(74) *Attorney, Agent, or Firm* — Wood, Herron & Evans, LLP (57) ABSTRACT

A wind turbine includes a nacelle which accommodates at least a generator and power electronics electrically interconnected between the generator and a power grid. At least one power electronic component is removably arranged in the nacelle in a region positioned between a floor level of the nacelle and a lower limiting surface, e.g. a bottom wall, of the nacelle. The space available in the interior parts of the nacelle is thereby utilized to a greater extent than in prior art wind turbines, and replacement of a power electronic component can be performed using ordinary lifting equipment. Furthermore, the risk of injury to maintenance personnel is reduced.

18 Claims, 6 Drawing Sheets

WIND TURBINE HAVING POWER ELECTRONICS IN THE NACELLE

FIELD OF THE INVENTION

The present invention relates to a wind turbine having a tower construction carrying a nacelle. The nacelle accommodates a power conversion system, including at least a generator, adapted to convert mechanical energy extracted from the wind into electrical energy which is supplied to a power grid. In the wind turbine according to the invention the space available in the nacelle is utilized in a very efficient manner.

BACKGROUND OF THE INVENTION

When, by means of a wind turbine, mechanical energy extracted from the wind has been converted into electrical energy by means of a generator, the electrical energy is normally supplied to a power grid, at least in part via power electronics. The required power electronics are often arranged in the nacelle, for example, in racks allowing access to power electronic components, for example, in order to allow maintenance or repair of a component, or in order to allow parts of the component to be replaced. The racks are often positioned in the nacelle in such a manner that the power electronic components can be removed from the racks along a substantially horizontal direction. This positioning is, inter alia, chosen in order to allow access to the power electronic components in a safe manner in case repair or maintenance is required on the components. High voltages, for example, on the order of 1000 V or more, are often present at or near power electronic components of wind turbines. It is therefore very important that the power electronic components are arranged in the nacelle in such a manner that they are accessible without risking electrical shocks to the maintenance personnel, and in a manner which allows maintenance personnel to perform repairs to the components while being in an upright position.

Thus, the power electronics occupy a significant part of the space available in the nacelle. Furthermore, if one or more power electronic components have to be repaired, removed or replaced, it is normally necessary to move the component(s) along a substantially horizontal direction, because the components are arranged in racks as described above. This makes it difficult to use ordinary lifting equipment, such as a crane, for the movement of the component(s), and it introduces a risk that a component is accidentally dropped in such a manner that body parts of the maintenance personnel are squeezed by the component. This is very undesirable.

DESCRIPTION OF THE INVENTION

It is, thus, an object of embodiments of the invention to provide a wind turbine in which the space available in the interior parts of the nacelle are utilized to a greater extent than in prior art wind turbines.

It is a further object of embodiments of the invention to provide a wind turbine in which replacement of a power electronic component can be performed using ordinary lifting equipment.

It is an even further object of embodiments of the invention to provide a wind turbine in which the risk of injury to maintenance personnel is reduced as compared to prior art wind turbines.

It is an even further object of embodiments of the invention to provide a wind turbine in which non-operable time of the wind turbine due to repair and maintenance can be reduced as compared to prior art wind turbines.

The present invention provides a wind turbine comprising a nacelle, the nacelle accommodating at least a generator and power electronics electrically interconnected between the generator and a power grid, wherein at least one power electronic component is removably arranged in the nacelle in a region positioned between a floor level of the nacelle and a lower limiting surface of the nacelle.

The present invention relates to a wind turbine, i.e., an apparatus which is adapted to convert energy of the wind into electrical energy. The wind turbine of the invention is of a kind which is coupled to a power grid, and it is preferably of a large modern type. Such wind turbines are provided with a tower construction carrying a nacelle. The nacelle carries a number of rotor blades arranged rotatably for extracting energy from the wind, and it is arranged rotatably on the tower construction in order to allow the nacelle to direct the rotor blades in the direction of the wind. The nacelle normally accommodates a number of components used when power is generated by the wind turbine, for example, a drive train, possibly including a gear arrangement, a generator, various electrical components and power electronics. The space for accommodating these components in the nacelle is limited, in particular because it is desirable to limit the overall dimensions of the nacelle in order to limit the total weight of the nacelle and in order to facilitate transport of the nacelle.

In the present context the term 'power electronics' should be interpreted to mean electronic parts which are used for modifying the electrical energy form, including, but not limited to, converters, inverters, various electronic filters, associated protection and control devices, etc. The term 'power electronic component' should be interpreted to mean a unitary unit comprising one or more power electronic parts. It should be noted that the component can be handled as one unit with respect to, for example, removal, replacement, testing, error or fault detection, etc.

According to the invention, at least one power electronic component is removably arranged in the nacelle of the wind turbine. In the present context the term 'removable' should be interpreted to mean that it is possible to remove the power electronic component from the nacelle without destroying the nacelle, the power electronic component or part of the nacelle or the power electronic component. This allows an entire power electronic component to be replaced by another, substantially identical power electronic component, for example, in case of complete or partly failure or malfunction of the power electronic component. Thus, in the case of failure or malfunction, repairing operations will not be performed on site. Instead, the faulty power electronic component is simply replaced by another power electronic component which has previously been tested as a unit, thereby ensuring that the component as such is operating properly. Thereby it is not necessary to arrange the power electronic components in the nacelle in such a manner that it is possible to gain access to them in a manner which allows personnel to perform repairing operations on site. It is only necessary to position them in such a manner that it is possible to remove/replace them. Furthermore, non-operational time of the wind turbine is minimized, since the wind turbine will be fully operational as soon as the faulty or malfunctioning power electronic component has been replaced, and not during some time span where repairing operations are performed.

The faulty or malfunctioning power electronic component may subsequently be transported to a repairing site or workshop, where it may be repaired in order to allow it to be positioned in a wind turbine at a later point in time.

At least one power electronic component is arranged in a region positioned between a floor level of the nacelle and a lower limiting surface of the nacelle. In the present context the term 'floor level' should be interpreted to mean a level defined by a floor arranged in an interior part of the nacelle, for example, to be walked upon by maintenance personnel and/or for carrying various equipment in the nacelle. The lower limiting surface of the nacelle may advantageously be an outer wall defining an interface between the interior of the nacelle and the surroundings, the wall being arranged at the bottom part of the nacelle. It should be noted that two or more different floor levels may be defined inside the nacelle, e.g. being interconnected by small stair sections, allowing personnel to move from one floor level to another. This may, for example, be the case if larger parts are arranged below the floor of one section of the nacelle than in other sections of the nacelle. It should be noted that a power electronic component should be regarded as being positioned in a region between a floor level of the nacelle and a lower limiting surface of the nacelle, if it is positioned between one such floor level and the lower limiting surface, even if part of the power electronic component exceeds above a level defined by another floor level.

Thereby, the space available below the floor level is utilized for accommodating at least some of the power electronics required during operation of the wind turbine. Thereby, these power electronic components do not occupy space in the part of the interior of the nacelle which is arranged above the floor level, and which is normally used for accommodating items and components which must be readily accessible, for allowing maintenance personnel to move inside the nacelle, and for storage of parts during service. Accordingly, more space is available in this part of the nacelle, i.e., the total space inside the nacelle is utilized to a greater extent. As described above, it is possible to position the power electronic components in this position because the power electronic components are removable, thereby allowing them to be replaced, rather than performing repairing operations on site.

The power electronic component(s) may be arranged in the nacelle in such a manner that it/they can be positioned in and/or removed from the region along a substantially vertical direction. In the present context the term 'vertical' should be interpreted to mean a direction which is defined by the direction in which the force of gravity acts.

Thus, according to this embodiment, it is possible to lift a given power electronic component out of the region between the floor level of the nacelle and the lower limiting surface of the nacelle along a substantially vertical direction. Since this is the direction along which ordinary lifting equipment, such as cranes, normally work, this makes it very easy to remove the power electronic components.

Furthermore, it is possible to gain access to the power electronic components without risking electrical shocks to the maintenance personnel.

At least one of the power electronic components may be a converter. This includes grid side converters as well as generator side converters. Alternatively or additionally, at least one of the power electronic components may be an inverter, a dv/dt filter, a grid filter, such as a grid choke, associated protection and control devices and/or any other suitable kind of power electronic component.

At least one floor plate of the nacelle floor may be provided with a safety switch arranged to interrupt the power supply to the power electronic component(s) in the case that the floor plate is at least partly removed. According to this embodiment it is efficiently ensured that no power is supplied to a power electronic component during maintenance or replacement thereof. Accordingly, the risk of electrical shocks to the maintenance personnel during such operations is eliminated. The safety switch may be or comprise an interlock switch.

The safety switch may be activated by the complete removal of a floor plate. Alternatively, it may be sufficient that a floor plate is only partly removed, e.g. by opening a hatch like floor plate which is attached to the floor construction via a hinge connection, or by sliding the floor plate along a direction which is substantially parallel to the floor. As an alternative, the safety switch may be activated by turning a key required in order to move a floor plate. In any event, the safety switch should be activated if a floor plate is moved in such a manner that it is possible to gain access to a region arranged below the floor level, thereby making it possible to gain access to the power electronic components arranged in this region.

At least one floor plate of the nacelle floor may be mounted slidingly in the interior of the nacelle, and a sliding movement of the floor plate may create a passage through the floor of the nacelle or close such a passage. According to this embodiment, the floor plate does not take up excessive space during maintenance requiring access to the region arranged below the floor level. Furthermore, the floor plate remains near the created passage and is readily available to the service personnel for closing the passage when the service has been completed.

Two or more power electronic components may be arranged in a power electronic assembly. This is an advantage because in the case that one or more of the power electronic components breaks down, the assembly is simply replaced, i.e. the faulty component(s) is/are not repaired. As a consequence, it is not necessary to position the power electronic components in such a manner that it is possible to gain access to each of them with the purpose of performing repairing operations. Thereby it is possible to arrange them in a less accessible region, such as the region between the floor level and the lower limiting surface of the nacelle. A power electronic assembly may advantageously comprise at least two different kinds of power electronic components, e.g. a converter as well as at least one kind of electrical filter.

The power electronic assemblies may advantageously comprise a box or casing enclosing the power electronic components of the assembly. In this case the box or casing may be used as a part of the floor construction of the nacelle floor, e.g. providing strength or stiffness to the floor construction.

At least one power electronic assembly may be arranged in the nacelle in such a manner that it can be positioned and/or removed along a substantially vertical direction. According to this embodiment the entire assembly can be moved as described above.

At least one power electronic assembly may be arranged in a region positioned between a floor level of the nacelle and a lower limiting surface of the nacelle. Thereby the advantages described above are obtained.

The nacelle may accommodate at least two power electronic assemblies. The power electronic assemblies may be substantially identical, for example, comprising the same kinds of power electronic components. Alternatively, the power electronic assemblies may differ from each other.

According to one embodiment, at least one power electronic assembly may be mounted on a wall part of a base frame of the nacelle. According to this embodiment it is even easier to gain access to the power electronic assembly with the purpose of removing or replacing the assembly. Furthermore, this assembly may be used for fault finding of all of the other assemblies, i.e. a faulty component can be identified without having to remove the floor plates. Finally, this assembly can contain switch gear for switching off the power of the power electronic components.

At least one power electronic assembly may be supported by a nacelle supporting structure. The nacelle supporting structure may advantageously form part of the base frame of the nacelle which is arranged in the region between the floor level and the lower limiting surface of the nacelle.

Alternatively or additionally, at least one power electronic assembly may be self-supported.

The wind turbine may further comprise a cooling system for cooling at least one of the power electronic components. The cooling system may, for example, be an air cooling system or a water cooling system, or a combined air and water cooling system. The lower limiting surface of the nacelle may form part of the cooling system. According to this embodiment it is possible to provide cooling for the power electronic components directly from the exterior of the nacelle, via the lower limiting surface.

At least one power electronic component may be mounted in a substantially horizontal direction, e.g. being mounted in a rack in which two or more power electronic components are arranged side by side, abutting the same substantially horizontal surface. This allows the power electronic components to be moved along a substantially vertical direction as described above.

BRIEF DESCRIPTION OF THE DRAWINGS

The invention will now be described in further detail with reference to the accompanying drawings in which.

DETAILED DESCRIPTION OF THE DRAWINGS

Figure 1:
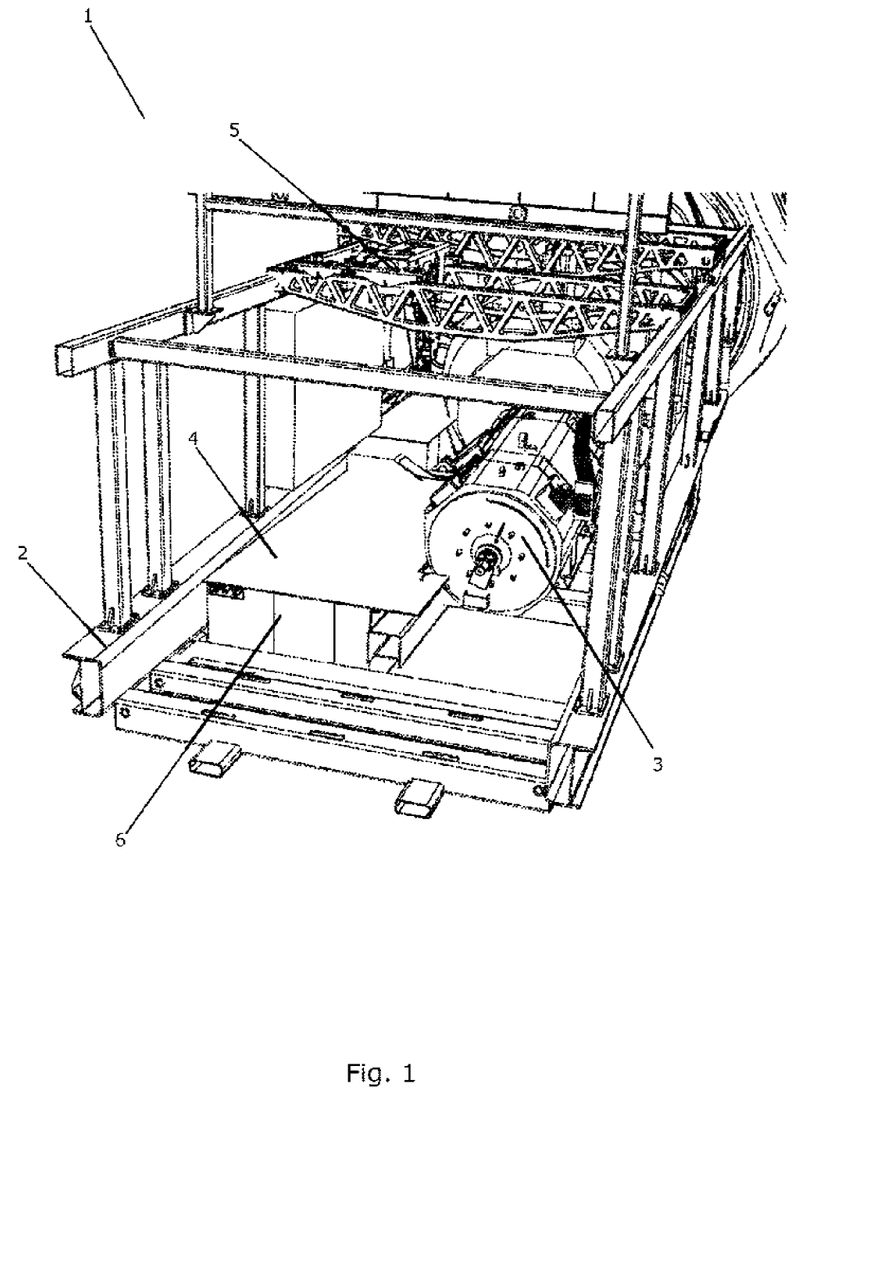
FIG. 1 is a perspective view of a nacelle of a wind turbine according to an embodiment of the invention.

FIG. 1 is a perspective view of a nacelle 1 for a wind turbine according to an embodiment of the invention. Parts of the nacelle 1, including the outer walls, have been removed for the sake of clarity and in order to reveal the components arranged inside the nacelle 1.

The nacelle 1 comprises a base frame 2, and it accommodates a generator 3. A number of floor plates 4, which in combination form a floor of the nacelle 1, are arranged inside the nacelle 1. Only some of the floor plates 4 are shown in FIG. 1, and it should be noted that the floor formed by the floor plates 4 extend essentially throughout the interior of the nacelle 1, thereby allowing personnel to walk on the floor.

An overhead crane 5 is mounted on the base frame 2. The overhead crane 5 can be used for lifting and moving heavy components in the interior of the nacelle 1.

Below the floor plates 4 a number of power electronic assemblies 6 are arranged. The power electronic assemblies 6 are not clearly visible in FIG. 1 due to the floor plates 4, and they will therefore be described in further detail below with reference to FIGS. 3-6.

Figure 2:
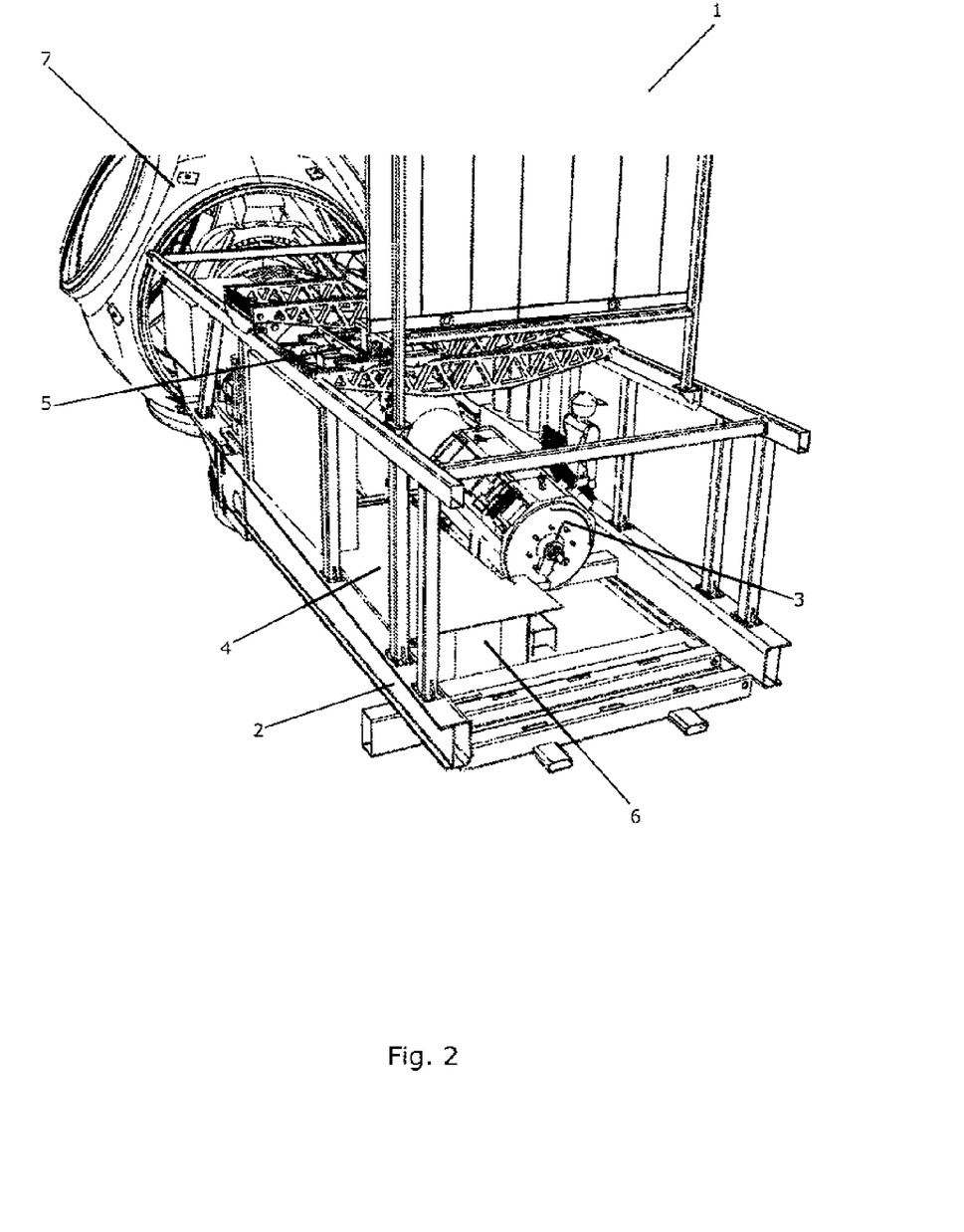
FIG. 2 is a perspective view of the nacelle of FIG. 1 from a different angle.

FIG. 2 is a perspective view of the nacelle 1 of FIG. 1, seen from a different angle. In FIG. 2 a rotor 7 is also visible. The rotor 7 is coupled to the generator 3 via a gear arrangement, which is not clearly visible in FIG. 2.

Figure 3:
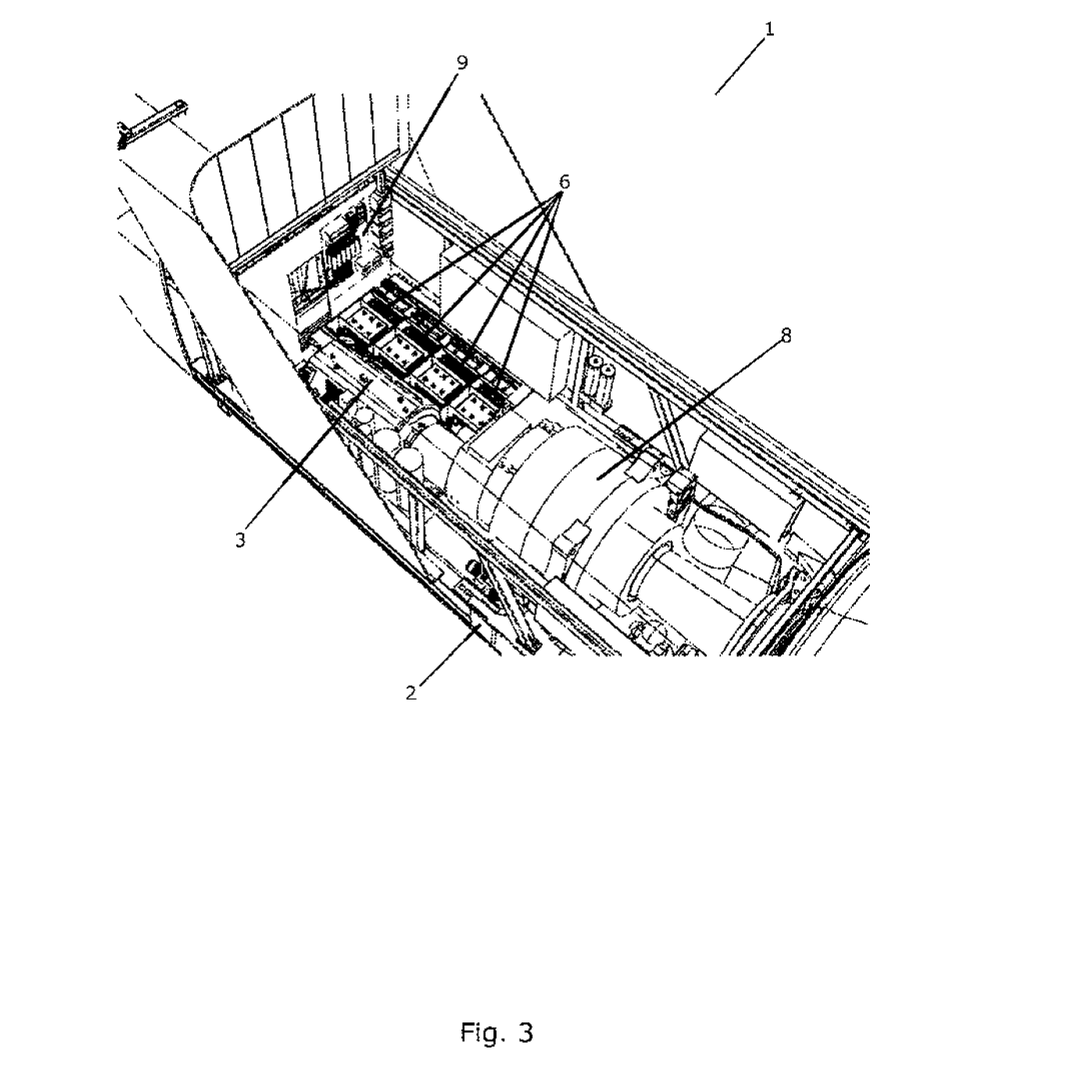
FIG. 3 is a perspective view of nacelle of FIGS. 1 and 2 from a different angle and with the floor plates removed.

FIG. 3 is a perspective view of the nacelle 1 of FIGS. 1 and 2, seen from yet a different angle. In FIG. 3 the gear arrangement 8 can be seen, because the overhead crane has been omitted for the sake of clarity.

Furthermore, in FIG. 3 the floor plates have been omitted in order to illustrate the power electronic assemblies 6. It can be seen that the nacelle 1 of FIG. 3 accommodates four identical power electronic assemblies 6. Each power electronic assembly 6 is connected at one side to the generator 3 and at the opposite side to circuitry 9 establishing an electrical connection to a power grid. It is clear from FIG. 3 that the power electronic components of the power electronic assemblies 6 can be positioned in and/or removed from the assemblies 6 along a substantially vertical direction. Furthermore, it is possible to position and/or remove one of the power electronic assemblies 6 along a substantially vertical direction. Thus, positioning or removal of a power electronic component or a power electronic assembly 6 can, e.g., be performed using the overhead crane 5 (visible in FIG. 1).

The design of the power electronic assemblies 6 will be described in further detail below with reference to FIGS. 5 and 6.

Figure 4:
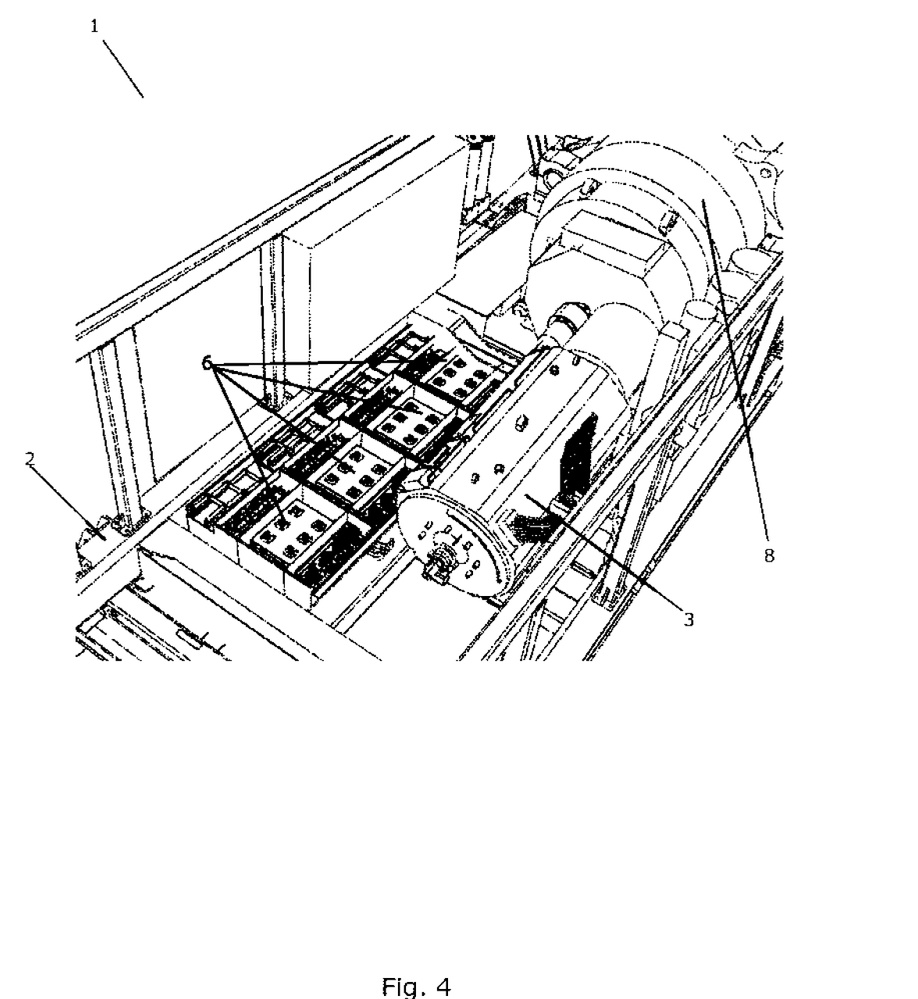
FIG. 4 is a perspective view of the nacelle of FIG. 3 from a different angle.

FIG. 4 is a perspective view of the nacelle 1 of FIG. 3. In FIG. 4 the power electronic assemblies 6 are more clearly visible than in FIG. 3.

Figure 5:
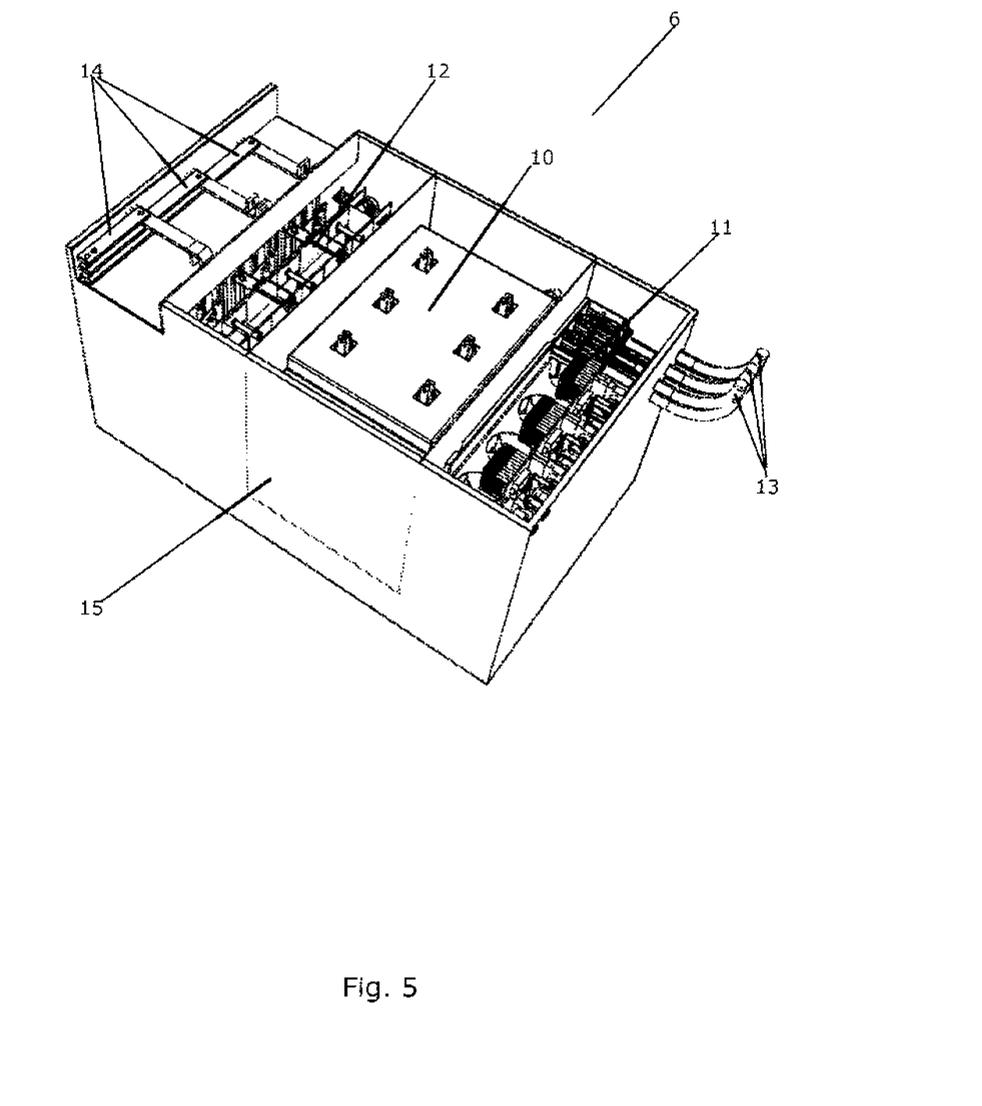
FIG. 5 is a perspective view of a power electronic assembly for use in a wind turbine according to an embodiment of the invention.

FIG. 5 is a perspective view of a power electronic assembly 6 of the kind shown in FIGS. 3 and 4. The power electronic assembly 6 comprises a converter part 10 with a generator side converter and a grid side converter. The assembly 6 further comprises dv/dt filters 11 arranged at the generator side of the converter part 10 and grid filters 12 arranged at the grid side of the converter part 10. Accordingly, the power electronic assembly 6 comprises three different kinds of power electronic components, i.e. converters 10, dv/dt filters 11 and grid filters 12.

Cables 13 are arranged to electrically connect the dv/dt filters 11 to the generator (not shown), and three bus bars 14 are arranged to electrically connect the grid filters 12 to circuitry (not shown) arranged for establishing a connection to a power grid.

The power electronic components 10, 11, 12 of the power electronic assembly 6 are accommodated in a box 15, thereby allowing all of the components 10, 11, 12 as well as the cables 13 and the bus bars 14 to be moved together as a single unit.

Figure 6:
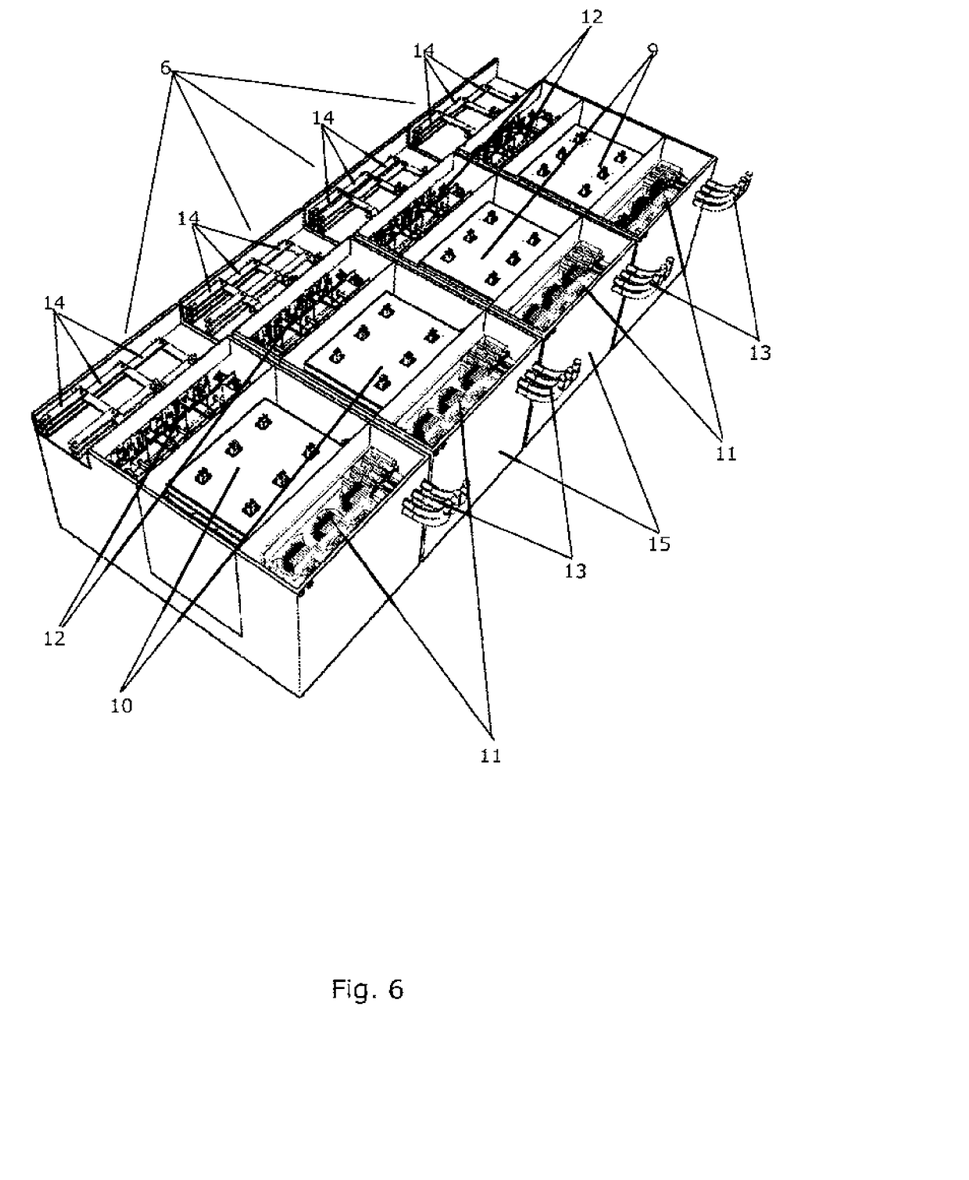
FIG. 6 is a perspective view showing four power electronic assemblies of the kind shown in FIG. 5.

FIG. 6 shows four identical power electronic assemblies 6 of the kind shown in FIG. 5. The power electronic assemblies 6 are arranged side by side in the manner illustrated in FIGS. 3 and 4.

The invention claimed is:

1. A wind turbine comprising a nacelle, said nacelle having an interior and an exterior and accommodating at least a generator and power electronics electrically interconnected between the generator and a power grid, wherein at least one power electronic component is removably arranged in the nacelle in a region positioned between a floor level of the nacelle and a lower limiting surface of the nacelle, wherein the lower limiting surface of the nacelle is an outer wall defining an interface between the interior of the nacelle and the exterior of the nacelle, the wall being arranged at the bottom part of the nacelle.

2. The wind turbine according to claim 1, wherein the power electronic component(s) is/are arranged in the nacelle in such a manner that it/they can be positioned in and/or removed from said region along a substantially vertical direction.

3. The wind turbine according to claim 1, wherein at least one of the power electronic components is a converter.

4. The wind turbine according to claim 1, wherein at least one floor plate of the nacelle floor is provided with a safety switch arranged to interrupt the power supply to the power electronic component(s) in the case that the floor plate is at least partly removed.

5. The wind turbine according to claim 1, wherein at least one floor plate of the nacelle floor is mounted slidingly in the interior of the nacelle, and wherein a sliding movement of the floor plate creates a passage through the floor of the nacelle or closes such a passage.

6. The wind turbine according to claim 1, wherein two or more power electronic components are arranged in a power electronic assembly.

7. The wind turbine according to claim 6, wherein at least one power electronic assembly is arranged in the nacelle in such a manner that it can be positioned and/or removed along a substantially vertical direction.

8. The wind turbine according to claim 6, wherein at least one power electronic assembly is arranged in a region positioned between the floor level of the nacelle and the lower limiting surface of the nacelle.

9. The wind turbine according to claim 6, wherein the nacelle accommodates at least two power electronic assemblies.

10. The wind turbine according to claim 6, wherein at least one power electronic assembly is mounted on a wall part of a base frame of the nacelle.

11. The wind turbine according to claim 6, wherein at least one power electronic assembly is supported by a nacelle supporting structure.

12. The wind turbine according to claim 6, wherein at least one power electronic assembly is self-supported.

13. The wind turbine according to claim 1, further comprising a cooling system for cooling at least one of the power electronic components.

14. The wind turbine according to claim 13, wherein the lower limiting surface of the nacelle forms part of the cooling system.

15. The wind turbine according to claim 1, wherein at least one power electronic component is mounted in a substantially horizontal direction.

16. A wind turbine comprising a nacelle, said nacelle having an interior and exterior and including a base frame and outer walls disposed about the base frame and accommodating at least a generator and power electronics electrically interconnected between the generator and a power grid, wherein at least one power electronic component is removably arranged in the nacelle in a region positioned between a floor level of the nacelle and a lower edge of the base frame, wherein the base frame is arranged in a region between the floor level of the nacelle and a lower limiting surface of the nacelle and the lower limiting surface of the nacelle is an outer wall defining an interface between the interior of the nacelle and the exterior of the nacelle, the wall being arranged at the bottom part of the nacelle.

17. The wind turbine according to claim 16, wherein the at least one power electronic component is supported by the base frame.

18. The wind turbine according to claim 16, wherein the generator and the at least one power electronic component are positioned within the confines of the base frame.

\* \* \* \* \*